US009004100B2

(12) United States Patent
Metz et al.

(10) Patent No.: US 9,004,100 B2
(45) Date of Patent: Apr. 14, 2015

(54) TANK CONTAINER WITH A PUMP ASSEMBLY

(75) Inventors: Rainer Metz, Emmerzhausen (DE); Thomas Schmidt, Niederdreisbach (DE)

(73) Assignee: WEW Westerwalder Eisenwerk GmbH, Weitefeld (DE)

( * ) Notice: Subject to any disclaimer, the term of this patent is extended or adjusted under 35 U.S.C. 154(b) by 129 days.

(21) Appl. No.: 13/700,892

(22) PCT Filed: Jun. 1, 2011

(86) PCT No.: PCT/EP2011/002730

§ 371 (c)(1), (2), (4) Date: Dec. 18, 2012

(87) PCT Pub. No.: WO2011/151073

PCT Pub. Date: Dec. 8, 2011

(65) Prior Publication Data

US 2013/0087227 A1 Apr. 11, 2013

(30) Foreign Application Priority Data

Jun. 2, 2010 (DE) ..................... 20 2010 007 504 U

(51) Int. Cl.
*F16K 21/04* (2006.01)
*B67D 7/02* (2010.01)
(Continued)

(52) U.S. Cl.
CPC .. *B67D 7/02* (2013.01); *B67D 7/04* (2013.01); *B67D 7/40* (2013.01); *B67D 7/58* (2013.01); *B67D 7/78* (2013.01); *F04B 23/02* (2013.01); *F04B 49/04* (2013.01)

(58) Field of Classification Search
CPC ............ F02M 37/12; B67D 7/02; B67D 7/04; B67D 7/46; B67D 2210/00154; B67D 2210/00157
USPC ............ 137/565.01, 565.11, 565.13, 565.14, 137/565.16, 565.26, 565.19, 565.18, 137/565.17, 355.12, 355.2; 417/28, 41, 417/380, 382; 60/493
See application file for complete search history.

(56) References Cited

U.S. PATENT DOCUMENTS 1,713,657 A 5/1929 Hogan
2,017,345 A 10/1935 Granberg
(Continued)

FOREIGN PATENT DOCUMENTS

DE 80 16 204 U1 10/1980
FR 2 219 111 A1 9/1974
WO WO 2009/092137 7/2009

OTHER PUBLICATIONS

English Translation of the International Search Report and Written Opinion dated Aug. 29, 2011 for Application No. PCT/EP2011/002730.

(Continued)

*Primary Examiner* — Craig Schneider
*Assistant Examiner* — Craig J Price
(74) *Attorney, Agent, or Firm* — Frost Brown Todd LLC

(57) ABSTRACT

The present invention relates to a pump assembly (5) for a supply unit, in particular a tank container (1), comprising: a pump line (51; 51*r, l*) for conveying a liquid medium between a container (3) and a removal connection, a pump (55) arranged in the pump line (51), and a feed connection (58), which is connected to the pump line (51) via two connecting lines (57). Here the pump (55) acts between the two connecting points (57*a*) of the connecting lines (57) in the pump line (51). The medium can therefore be delivered as desired directly by the pump (55) between the feed connection (58) and the container (3), between the container (3) and the removal connection (52), or between the feed connection (58) and the removal connection (52). The invention further relates to a fuel supply unit having a pump assembly (5) according to the invention and a container (3).

17 Claims, 3 Drawing Sheets

(51) Int. Cl.

| | |
|---|---|
| ***B67D 7/04*** | (2010.01) |
| ***B67D 7/40*** | (2010.01) |
| ***B67D 7/58*** | (2010.01) |
| ***B67D 7/78*** | (2010.01) |
| ***F04B 23/02*** | (2006.01) |
| ***F04B 49/04*** | (2006.01) |

(56) References Cited

U.S. PATENT DOCUMENTS

| | | | | |
|---|---|---|---|---|
| 2,731,171 | A * | 1/1956 | Mankin et al. | 222/26 |
| 3,216,177 | A * | 11/1965 | Bracken et al. | 95/24 |
| 3,406,710 | A * | 10/1968 | Voda | 417/38 |
| 4,838,302 | A * | 6/1989 | Prange | 137/355.12 |
| 5,392,814 | A * | 2/1995 | Brotcke et al. | 137/899 |
| 5,901,802 | A | 5/1999 | Sunohara et al. | |
| 2013/0146163 | A1* | 6/2013 | Kim | 137/565.16 |

OTHER PUBLICATIONS

English machine translation of French Patent No. FR 2 219 111.

German Search Report dated Apr. 6, 2011 for Application No. 20 2010 007 504.1.

English machine Translation of German Patent No. 80 16 204 U1.

* cited by examiner

TANK CONTAINER WITH A PUMP ASSEMBLY

The present invention relates to a tank container with a pump assembly. In particular tank containers are increasingly used as mobile and/or stationary supply units, e.g. for fuel or water. However, normal standard containers can only be used to a limited extent as supply units since they generally do not have a discrete conveyor device by which they can be filled or with the aid of which the medium, e.g. fuel or water, can be discharged from the vessel of the tank container (drinking water supply, refuelling vehicles).

Mobile supply units or mobile filling stations have been used for a relatively long time, in particular on construction sites. Such supply units are provided with a pump assembly, but this generally only allows discharge from the tank, whilst the tanks can be filled only via external pump units such as are provided for example on tankers. Such pump assemblies are known, e.g. from FR 219 111 A1.

Above all for military uses, however, tank containers supply units and corresponding pump assemblies are necessary, with the aid of which the tank of a tank container can not only be emptied but also filled and with which furthermore media can also be conveyed out of an external tank and can be reloaded, e.g. between two external supply units.

This object is achieved by the tank container as claimed in claim 1.

In this case it is provided that the pump assembly has a pump line which connects a tank, in particular a fuel tank, to a discharge connection, and a pump (e.g. a fuel feed pump) operates in the pump line. In this case the pump line is connected via two connecting lines to a feed connection and the pump itself operates between the two connection points of the connecting lines to the pump line.

With this assembly several delivery operating modes are made possible in a simple manner. Thus the medium can be conveyed directly—i.e. for example by the action of an external pump or by the effect of gravity—or via the pump itself between the feed connection and the tank. The medium can also be conveyed between the tank and the discharge connection, between the feed connection and the discharge connection, and in each case via the pump itself or directly, bypassing the pump, by the effect of gravity or via an external pump.

The embodiments of claims 2 to 10 relate to modifications of the invention which are suitable in particular for conveying fuel.

In this case in order to drive the pump a hydraulic circuit is provided which drives a hydraulic motor which in turn is coupled to the pump itself, and the hydraulic circuit is supplied via a hydraulic pump. Thus in particular combustible fuels can be handled safely without any danger of electrostatic ignition risks.

By means of appropriate hydraulic switching and/or control elements the hydraulic motor which drives the pump and thus also the pump can be driven bidirectionally with adjustable output without having to change the operating direction of the hydraulic pump.

In order to prepare for unwanted overfilling of the tank, an overfilling indicator is provided which is coupled via a pneumatic control circuit with a pneumatically actuated first switching element, which engages in the hydraulic circuit so that in response to a pneumatic switching signal of the overfilling indicator the operation of the hydraulic motor and thus of the pump is interrupted without it being necessary to interrupt the operation of the hydraulic pump for other functions. In a further embodiment a second pneumatically actuated switching element is provided which reacts to a pressure drop in the pneumatic circuit and interrupts the operation of the hydraulic pump and the pump.

In addition or as an alternative a further third pneumatically operated switching element can be provided in the event of such a pressure drop closes a pneumatically actuated control valve which directly interrupts the fuel delivery into or out of the tank.

In one embodiment the discharge connection is provided on a hose drum arrangement which is connected to the pump line in order also to supply the pump assembly or objects remote from a supply unit with the medium (e.g. fuel or water).

In this case it is also possible to drive the hose drum arrangement by means of hydraulic motors which are coupled via the hydraulic circuit to the hydraulic pump. Thus the hose drum drive for winding and/or unwinding is insignificant when conveying combustible media.

Flow meters and/or flow adjustment means in the pump line or between the pump line and the hose drum arrangement improve the dispensing control for discharge of media.

A drive motor which with appropriate shielding may be designed as an internal combustion engine is provided in order to drive the hydraulic pump and a compressor which supplies the pneumatic control circuit.

A tank container for fuel, with a corresponding pump assembly and a fuel tank makes possible a storage and transport unit for universal use. Such a tank container unit, universally handled both in the filled and also in the partially filled or empty state, can be transported, stored and operated largely autonomously. An embodiment of the present invention is illustrated in the drawings, in which.

Figure 1:
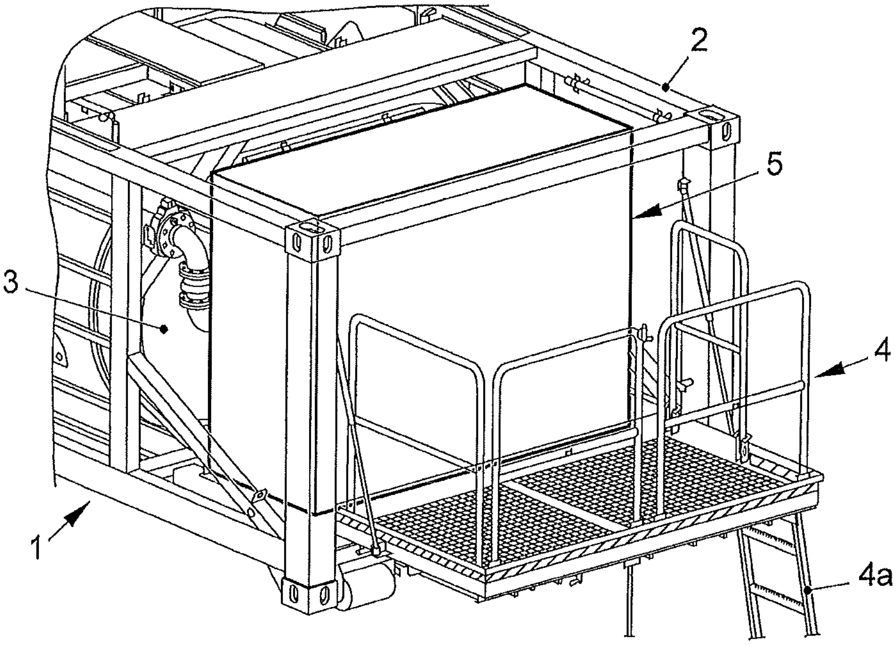
FIG. 1 shows a perspective partial view of the rear end of a supply unit constructed as a tank container for fuel with a pump assembly shown as a 'clack box'.

FIG. 1 shows a fuel supply unit which is constructed as a tank container 1, in the framework 2 of which at its rear end a pump assembly 5 is provided which immediately adjoins a tank, in this case the fuel tank 3. A folding working platform 4 which is accessible via a ladder 4*a* is provided for operating the pump assembly 5. Thus the tank container 1 or the pump assembly 5 can also be operated when the tank container 1 is located on a vehicle (not shown).

Figure 2:
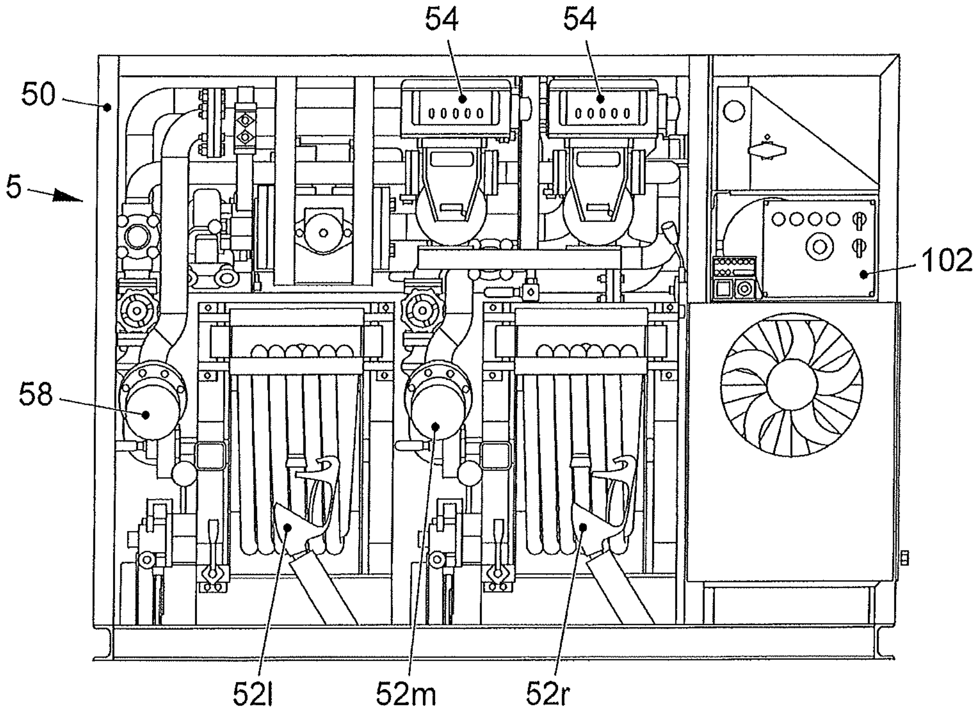
FIG. 2 shows a view of the front panel of the pump assembly indicated in FIG. 1.
Figure 3:
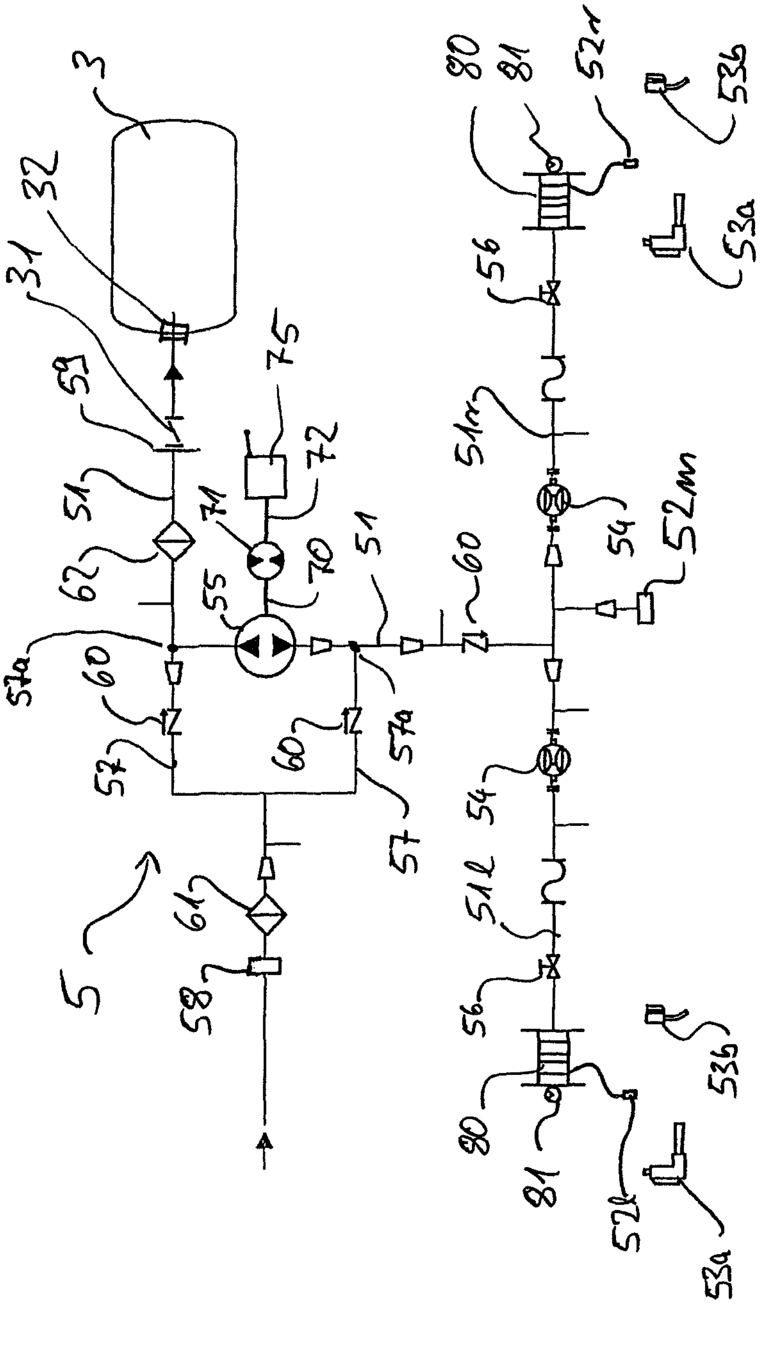
FIG. 3 shows a schematic diagram of a pump assembly according to the invention which is connected to a tank.
Figure 4:
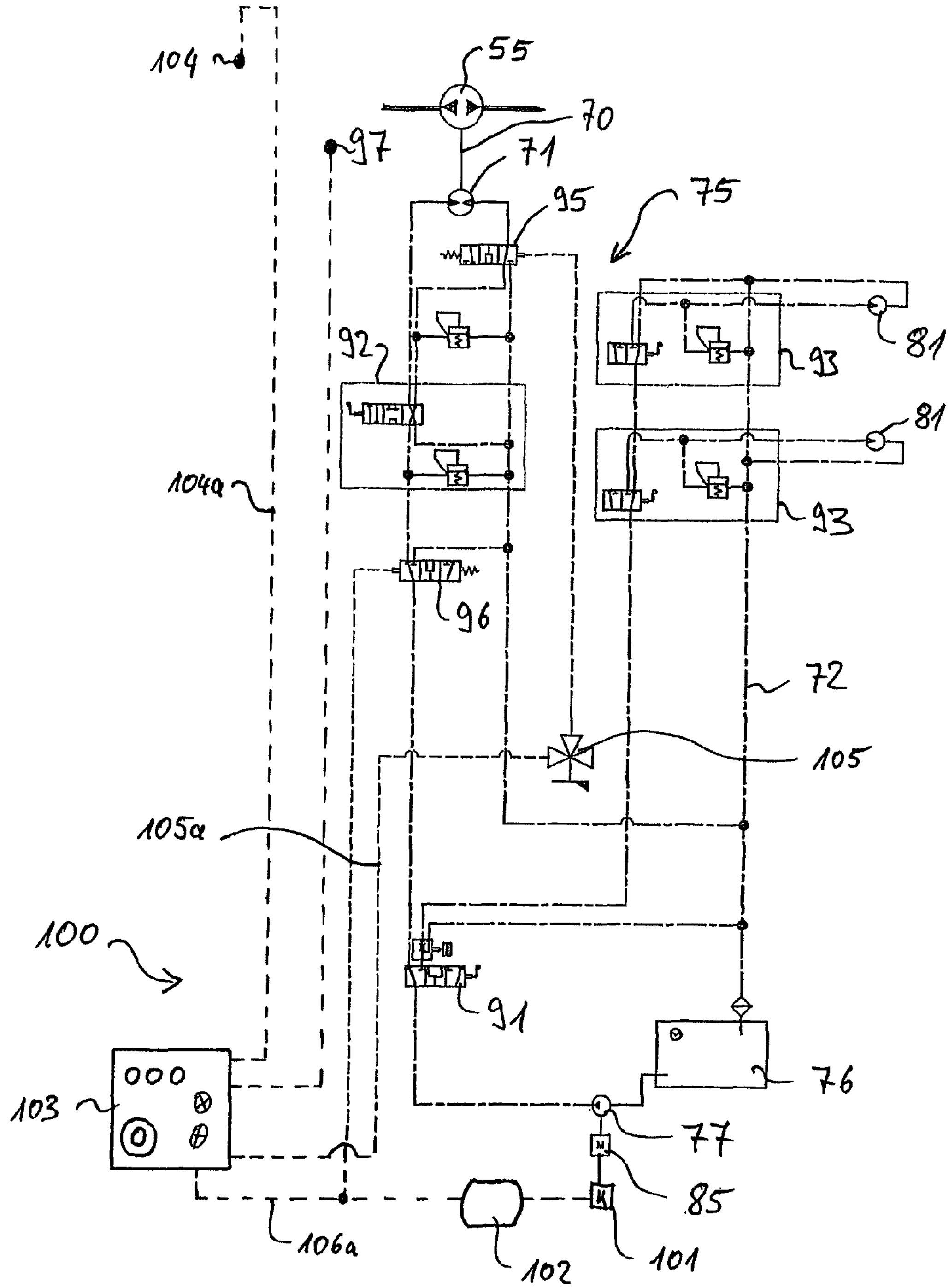
FIG. 4 shows a schematic illustration of the hydraulic circuit and the pneumatic control of the pump assembly according to FIG. 3.

The design and functioning of the pump assembly 5 is explained with the aid of FIGS. 2, 3 and 4.

The pump assembly 5 is disposed in a frame 50 which can be removably coupled to the tank container 1 or the framework 2 and can be fixed thereon.

FIG. 2 shows the pump assembly 5 from the viewpoint of an operator with the most important connections and operating elements. The circuit diagram in FIG. 3 shows the design and functioning of the pump assembly 5. In this case a pump line 51 is provided which leads off from the fuel tank 3, is led via a pump 55 and opens into a right and a left branch 51*r*, 51*l*. Discharge connections 52*r*, 52*l* are disposed in the branches 51*r*, 51*l* of the pump line 51 and can be coupled via dry clutches respectively to different tap/connecting valves 53*a*, 53*b*. A further fixed discharge connection which is suitable for greater flow rates and is provided with a flange connection is designated by 52*m*. Flow meters 54 and flow control valves 56 are provided in the branches 51*r*, 51*l*. Furthermore the flow rate can also be manually controlled at the tap/discharge valves 53*a*, 53*b*.

On both sides of the pump 55 there are connection points 57*a* from which connecting lines 57 lead off which are brought together and open into a feed connection 58. At the tank end the pump line 51 ends in a tank connection 59.

Non-return valves 60 are provided in the pump line and in the connecting line 51, 57 in order to regulate the flow direction. A screen 61 is provided between the feed connection 58 and the connection points 57*a* of the connecting lines 57 in order to collect contaminants or foreign bodies entering the connecting line 57 via the feed connection 58. A flame trap 62 provided in the pump line 51 between the tank connection 59 and the one connection point 57*a* prevents any flame front which may be produced in the pump lines 51 or in the connecting lines 57 from entering the fuel tank 3.

A shutoff valve 31 and a pneumatically controllable bottom valve 32 are provided between the tank connection 59 and the fuel tank 3.

The pump 55 is coupled via a drive shaft 70 to a hydraulic motor 71 which in turn is driven via a hydraulic circuit 72. The speed and running direction of the hydraulic motor 71 are controllable via switching and/or control elements which can be operated via a hydraulic control means 75. Thus the pump 55 can convey adjustable flow quantities in both directions.

In principle the following operating modes are therefore possible.

1. Discharge from the tank 3 via one or more of the discharge connections 52*l*, 52*m*, 52*r*. For this purpose fuel is conveyed out of the tank 3 via the opened shutoff valve 31 and the opened bottom valve 32 through the pump line 51 into the two pump line branches 51*r*, 51*l* and is discharged there via the connections 52*l*, 52*r* or the tap/discharge valves 53*a*, 53*b* connected thereto and/or the discharge connection 52*m*.

2. Discharge from an external unit connected to the feed connection 58. In this case the medium is conveyed either via the connection 58 and the upper branch of the connecting line 57 via the pump 55 into the pump line 51 and is discharged via the discharge connections 52*l*, 52*m*, 52*r* directly, without use of the pump 55, via the lower branch of the connecting line 57 into the pump line 51 and in the same way via the discharge connections 52*l*, 52*m*, 52*r*.

3.Filling of the tank 3 can take place via the feed connection 58, using the pump 55 and the lower branch of the connecting line 57, or directly, without use of the pump 55, via the upper branch of the connecting line 57, e.g. by means of gravity or an external pump.

4.Transfer between external units takes place by coupling of an external unit to the feed connection 58 and coupling of a further external unit to the discharge connection 52*m*. In this case the transfer can take place via the pump 55 and the upper connecting line 57 or without using the pump 55 via the lower branch of the connecting line 57 into the pump line 51 and the discharge connection 52*m*.

The discharge connections 52*l* and 52*r* are coupled via hose drums 80 to the branches 51*l*, 51*r* of the pump line 51. The hose drums 80 are each provided with a hydraulic motor 81 which is likewise connected to the hydraulic circuit 72 (connection not shown in FIG. 3) and can also be driven via the hydraulic motor 71 for winding or unwinding.

FIG. 4 shows the design of the hydraulic control means 75 in principle. In this case the hydraulic motor 71 is coupled via the lines of the hydraulic circuit 72 (represented by dash-dot lines) to a hydraulic oil tank 76 and a hydraulic pump 77 which is driven via a drive motor 85 (e.g. an internal combustion engine).

In this case a hydraulic actuating element 91 regulates the distribution and flow rate in the direction of the hydraulic motor 71 and in the direction of the drive motors 81. The drive motors 81 for the hose drums 80 are controlled via hydraulic switches 93 so that the hose drums 80 can be unwound manually and wound up hydraulically. In other embodiments the unwinding can be assisted hydraulically.

A further hydraulic actuating element 92 regulates the operating direction and/or the running speed of the hydraulic motor 71 and of the pump 55 coupled thereto via the drive shaft 70.

As a further safeguard a pneumatic control means 100 is provided which is supplied via a compressor 101 and a storage tank 102 (supply lines shown dashed) and can be operated via a control display 103. The compressor 101 can likewise be driven via the drive motor 80, directly via a connecting shaft or also indirectly via the hydraulic circuit 72.

In this case a pneumatic signal line 104*a* is provided which is connected to a filling level sensor 104 which is disposed in the fuel tank 3 and which, when a specific filling level in the tank 3 is reached, transmits a pneumatic signal to the control means/display 102 which then transmits a signal via a pneumatic actuating line 105*a* and a control valve 105 to a first pneumatically actuated switching element 95 which switches off the hydraulic motor 71 and thus the pump 55 so that overfilling of the tank 3 cannot occur.

A second pneumatically actuated switching element 96 is likewise coupled to the pneumatic line 106*a* and in the case of a pressure drop in the pneumatic system the hydraulic motor 71 and thus the pump 55 is also switched off.

In addition or as an alternative, a pneumatic actuating element 97 is provided for actuation of the bottom valve 32 and is likewise activated in the event of a pressure drop in the pneumatic line 106*a* via the control means/display 103 and closes the bottom valve 32. Thus in the event of a pressure drop in the pneumatic system no medium/fuel can escape from the tank 3, not even under the effect of gravity.

The control means/display 102 is provided with indicator lights which display the respective operational state of the pneumatic system and to some extent also of the pump assembly 5, and also has an emergency switch during operation shuts down the hydraulic motor 71 and thus the pump 55 and closes the bottom valve 32 of the tank via the pneumatic element 97. The emergency stop switch is also coupled to the drive motor 85 which is then also switched off.

Further variants and modifications of the invention are apparent to the person skilled in the art in the context of the claims.

The invention claimed is:

1. A tank container with a pump assembly comprising:

a pump line for conveying a liquid medium between a tank and a discharge connection, a pump disposed in the pump line, and a feed connection which is connected via two connecting lines to the pump line, wherein the pump acts between the two connection points of the connecting lines in the pump line and the medium can be conveyed as required directly or via the pump between the feed connection and the tank, between the tank and the discharge connection, or between the feed connection and the discharge connection, wherein the pump is driven via a hydraulic motor which for drive purposes is coupled via a hydraulic circuit to a hydraulic pump, wherein the hydraulic circuit is provided with a hydraulic switching and regulating element so that the hydraulic motor and thus also the pump can be operated bidirectionally and with an adjustable flow rate.

2. The tank container as claimed in claim 1, wherein the hydraulic circuit has a pneumatically actuated first switching element which is coupled via a pneumatic control to an overfilling indicator on the tank, so that when a specific filling level in the tank is reached the overfilling indicator reacts and transmits a pneumatic switching signal to the switching element which in response to the switching signal interrupts operation of the hydraulic motor and thus of the pump.

3. The tank container as claimed in claim 2, wherein the hydraulic circuit has a pneumatically actuated second switching element which in the event of a pressure drop in the pneumatic control interrupts operation of the hydraulic pump and thus of the pump.

4. The tank container as claimed in claim 2, wherein the hydraulic circuit has a pneumatically actuated switching element which in the event of a pressure drop in the pneumatic control closes a pneumatically actuated actuating valve disposed in the pump line between the tank and the pump so that the conveying of the liquid medium is interrupted.

5. The tank container as claimed in claim 3, wherein the hydraulic circuit has a pneumatically actuated switching element which in the event of a pressure drop in the pneumatic control closes a pneumatically actuated actuating valve disposed in the pump line between the tank and the pump so that the conveying of the liquid medium is interrupted.

6. The tank container as claimed in claim 1, wherein the hydraulic circuit has a pneumatically actuated switching element which in the event of a pressure drop in the pneumatic control closes a pneumatically actuated actuating valve disposed in the pump line between the tank and the pump so that the conveying of media is interrupted.

7. The tank container as claimed in claim 1, wherein the discharge connection is connected via a hose drum arrangement to the pump line.

8. The tank container as claimed in claim 7, wherein the hose drum arrangement can be driven via a hydraulic motor which is coupled via a hydraulic circuit to a hydraulic pump so that the hose drum arrangement can be wound up and unwound under hydraulic control.

9. The tank container as claimed in claim 7, wherein a flow meter and at least one flow control valve are disposed between the pump line and the hose drum arrangement.

10. The tank container as claimed in claim 1, wherein a drive motor, in particular an internal combustion engine, is provided for driving the hydraulic pump and a compressor which supplies a pneumatic control.

11. The tank container as claimed in claim 1, wherein the tank comprises a fuel tank.

12. The tank container as claimed in claim 1, wherein the hydraulic circuit has a pneumatically actuated first switching element which is coupled via a pneumatic control to an overfilling indicator on the tank, so that when a specific filling level in the tank is reached the overfilling indicator reacts and transmits a pneumatic switching signal to the switching element which in response to the switching signal interrupts the operation of the hydraulic motor and thus of the pump.

13. The tank container as claimed in claim 1, wherein the hydraulic circuit has a pneumatically actuated second switching element which in the event of a pressure drop in the pneumatic control interrupts the operation of the hydraulic pump and thus of the pump.

14. The tank container as claimed in claim 1, wherein the hydraulic circuit has a pneumatically actuated second switching element which in the event of a pressure drop in the pneumatic control interrupts the operation of the hydraulic pump and thus of the pump.

15. The tank container as claimed in claim 1, wherein the hydraulic circuit has a pneumatically actuated switching element which in the event of a pressure drop in the pneumatic control closes a pneumatically actuated actuating valve disposed in the pump line between the tank and the pump so that the conveying of the liquid medium is interrupted.

16. A tank container with a pump assembly comprising:

a pump line for conveying a liquid medium between a tank and a discharge connection, a pump disposed in the pump line, and a feed connection which is connected via two connecting lines to the pump line, wherein the pump acts between the two connection points of the connecting lines in the pump line and the medium can be conveyed as required directly or via the pump between the feed connection and the tank, between the tank and the discharge connection, or between the feed connection and the discharge connection, wherein the pump is driven via a hydraulic motor which for drive purposes is coupled via a hydraulic circuit to a hydraulic pump, wherein the hydraulic circuit has a pneumatically actuated first switching element which is coupled via a pneumatic control to an overfilling indicator on the tank, so that when a specific filling level in the tank is reached the overfilling indicator reacts and transmits a pneumatic switching signal to the switching element which in response to the switching signal interrupts the operation of the hydraulic motor and thus of the pump.

17. A tank container with a pump assembly comprising:

a pump line for conveying a liquid medium between a tank and a discharge connection, a pump disposed in the pump line, and a feed connection which is connected via two connecting lines to the pump line, wherein the pump acts between the two connection points of the connecting lines in the pump line and the medium can be conveyed as required directly or via the pump between the feed connection and the tank, between the tank and the discharge connection, or between the feed connection and the discharge connection, wherein the pump is driven via a hydraulic motor which for drive purposes is coupled via a hydraulic circuit to a hydraulic pump, wherein a drive motor, in particular an internal combustion engine, is provided for driving the hydraulic pump and a compressor which supplies a pneumatic control.

* * * * *